May 13, 1930.  R. H. CRAMER  1,758,653
MACHINE FOR ASSEMBLING BEARINGS
Filed Oct. 11, 1928   2 Sheets-Sheet 1
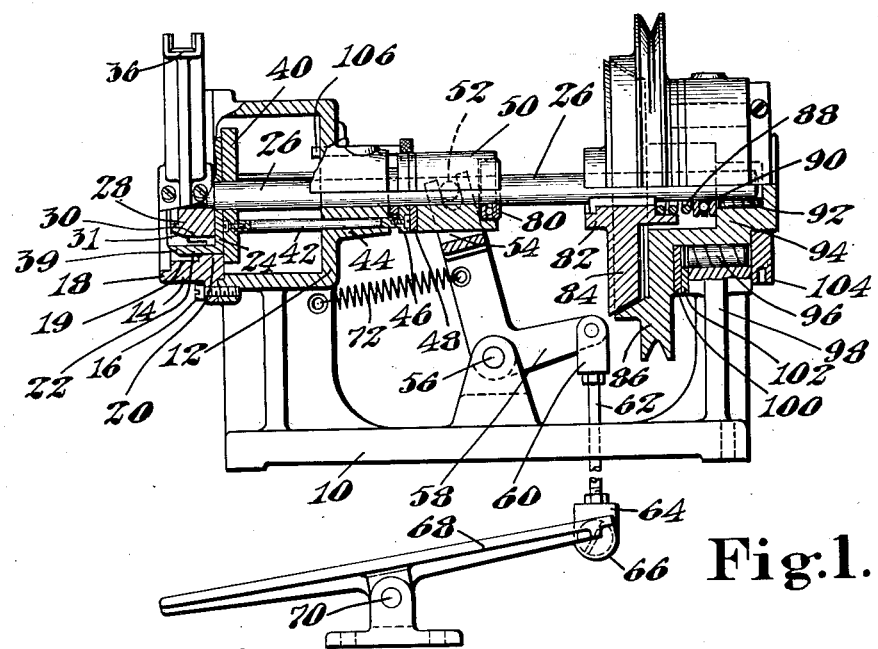
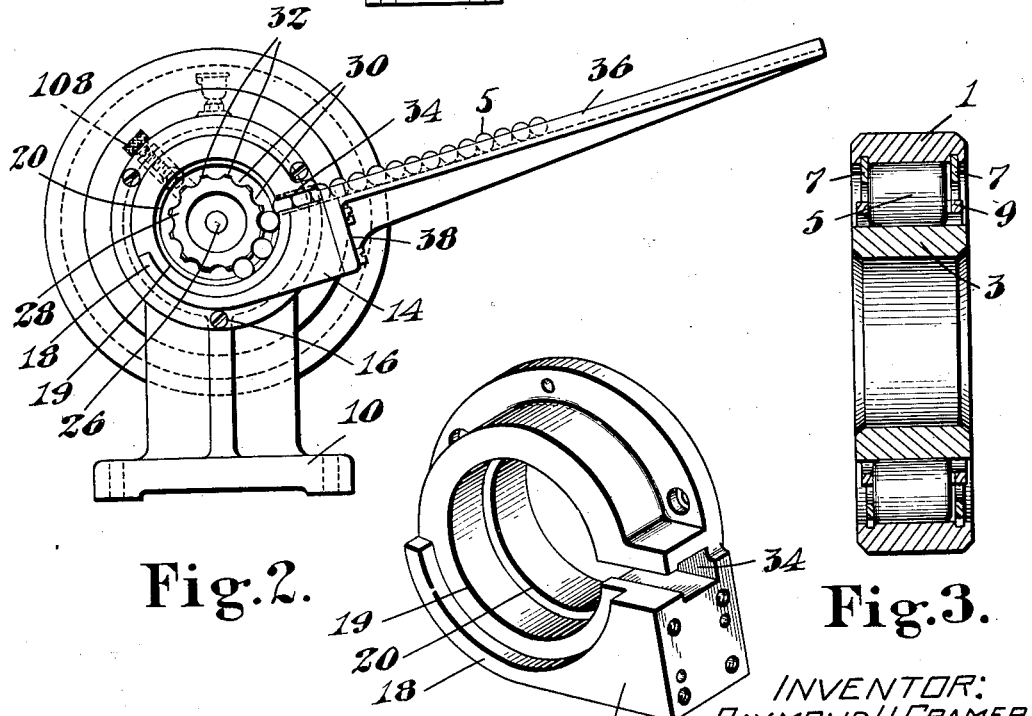
INVENTOR:
RAYMOND H. CRAMER,
BY
Cales P. Moore
HIS ATTORNEY.

May 13, 1930. R. H. CRAMER 1,758,653
MACHINE FOR ASSEMBLING BEARINGS
Filed Oct. 11, 1928 2 Sheets-Sheet 2

INVENTOR:
RAYMOND H. CRAMER,
BY
Gales P. Moore
HIS ATTORNEY.

Patented May 13, 1930

1,758,653

UNITED STATES PATENT OFFICE

RAYMOND H. CRAMER, OF NEWARK, NEW JERSEY, ASSIGNOR TO GENERAL MOTORS CORPORATION, OF DETROIT, MICHIGAN, A CORPORATION OF DELAWARE

MACHINE FOR ASSEMBLING BEARINGS

Application filed October 11, 1928. Serial No. 311,823.

This invention relates to machines for assembling bearings and comprises all the features of novelty herein disclosed. An object of the invention is to provide an improved machine for assembling rolling elements in the openings of a separator. Another object is to provide an improved machine for assembling a series of rolling elements, a separator, and a race ring. Another object is to provide an improved machine for assembling a circular series of rolling elements and a race ring. Still another object is to provide a bearing assembling machine which is simple and efficient and capable of quick and easy operation.

To these ends and, to improve generally and in detail upon devices of this character, the invention also consists in the various matters hereinafter disclosed and claimed. In its broader aspects, the invention is not necessarily limited to the specific embodiment selected for illustrative purposes in the accompanying drawings in which Fig. 1 is a side elevation of the machine with some parts in section.

Fig. 2 is a front end elevation.

Fig. 3 is a section view of a typical bearing to be assembled.

Figs. 4, 5 and 6 are perspective views of details to a larger scale.

Figure 5:
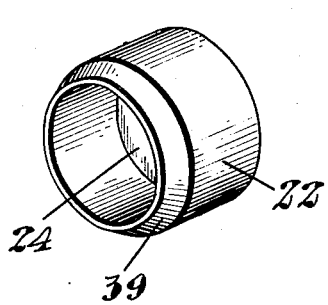
Figure 6:
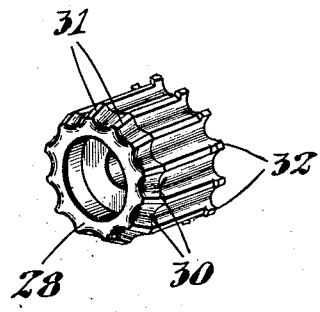
Figure 7:
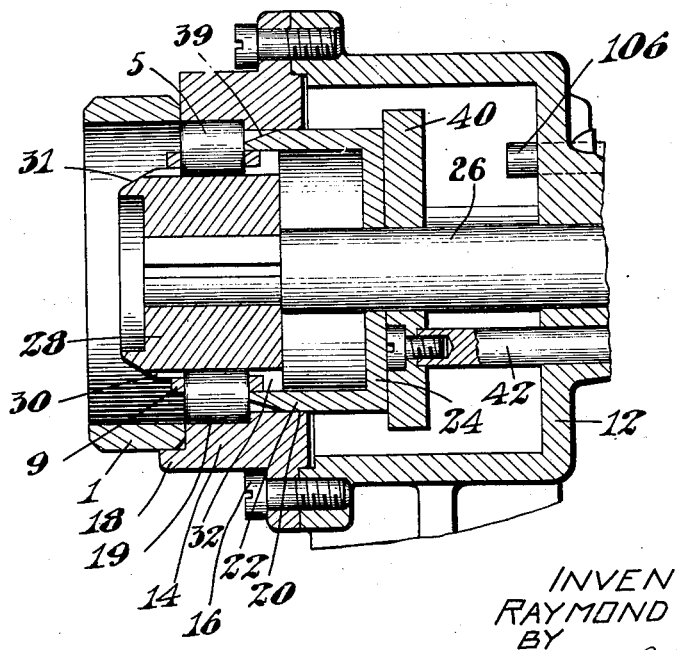
Fig. 7 is a vertical section of a portion of the machine to a larger scale than Fig. 1 and with some parts in another position.

Fig. 3 illustrates a typical bearing in connection with which the machine is used. The illustrated bearing comprises an outer race ring 1, an inner race ring 3, a circular series of short cylindrical rollers 5 guided at their ends by retaining rings 7, and a separator 9 comprising a plain cylindrical sleeve or band with substantially rectangular openings smaller than the rollers at their diameter and holding them outwardly towards the outer race ring. The rollers are fed radially into the openings of the separator while the separator rotates and then both separator and rollers are pushed endwise into the outer race ring, at least one of the retaining rings 7 then being unattached.

The machine comprises a base 10 having a standard carrying a housing 12, a loading casing or receiver 14 being attached to the housing by screws 16. The casing 14 has a semicircular lip 18 by which the outer race ring 1 is located concentric with the separator during the assembly operation and a cylindrical roller retaining wall 19 concentric with the lip 18 and separator. The casing also has a smooth bore 20 surrounding and guiding a cup shaped ejector comprising a cylindrical flange 22 and a bottom wall 24 loosely surrounding a rotary shaft 26. The end of the shaft is keyed to a block or disc 28 having scallops or recesses 30 on its periphery to receive the rollers. The block or disc also has a tapered end 31 to facilitate receiving the separator and has edge projections 32 to position the separator and supports the separator to be filled when the ejector flange 22 and ejector are moved rearwardly into the housing 12 upon inserting the separator into the machine. The rollers pass into the casing or receiver 14 through a rectangular radial guide slot 34 (Figs. 2 and 4) which is in alignment with the bottom wall of a chute 36 having a bracket portion 38 attached by screws to an enlargement of the casing 14. The chute may be filled with rollers by hand or by means of any suitable feeder. The chute is inclined so the rollers will run down through the slot into the roller openings of the separator, as the separator turns. The rollers rest in the recesses 30 of the block or disc 28 and are externally held by the wall 19. The rollers lock the separator to the disc and insure rotation of the separator as soon as one roller enters. When the ejector is advanced, the remaining rollers in the chute are held or pushed back out of the way by a conical surface 39 on the flange 22.

The ejector is retracted by pushing an empty separator against it and is advanced to eject a filled separator by the following mechanism which also starts the rotation of the shaft 26. A disc 40, surrounding the shaft, abuts against the ejector and is connected to three rods 42 guided in openings of a boss 44 on the housing 12, the rods being connected also to a disc 46 loose on the shaft outside the housing. The disc 46 abuts against a fiber cushion 48 secured to a block 50 which is slidable on the shaft. Pins 52 project from the block 50 into slots of a bifurcated arm 54 which is pivoted at 56 to a lug on the base. The arm 54 forms part of a lever 58 pivotally connected by a clevis 60 and a rod 62 to a block 64 which is pivoted to a lug 66 at one side of a treadle 68 pivoted at 70 in any convenient location. A coil spring 72 pulls the bifurcated arm in such a direction as to move the slide block 50 and connected devices forwardly against the ejector when the treadle is released. Stepping on the treadle (at the rearward side of its pivot 70) allows the ejector to be pushed back by an empty separator and also starts the shaft in rotation as follows:

A ball thrust bearing 80 is carried in a recess of the slide block and its outer ring is arranged to engage the hub 82 of a cone clutch member 84. The clutch member 84 is splined on the shaft and arranged to engage a conical face on a pulley 86 driven preferably at a speed of about 100 R. P. M. A coil spring 88 interposed between the hub 82 and a ball thrust bearing 90 tends to release the clutch. The shaft 26 is journalled in the boss 44 and in a roller bearing 92 set in a recess of the hub 94 of the pulley 86 which is journalled in a roller bearing 96 set in a bore of a standard 98. Thrust rings 100 and 102 are secured respectively to the pulley and to the standard and a split nut 104 is threaded on the hub 94 to hold these parts assembled. A stop pin 106 is arranged in the path of the disc 40 and held in adjusted position by a locking screw 108 threaded in a boss of the housing 12.

In operation, the treadle is actuated to engage the clutch members while a separator is pushed over the disc or block 28 and retracts the ejector. The separator turns with the block 28 and its openings receive the rollers successively from the chute. When the separator is filled, the operator presents an outer race ring to the lip 18 of the housing and releases the treadle. The ejector then advances under control of the spring 72 and pushes the loaded separator endwise into the bore of the race ring, the cylindrical wall 19 of the loading casing 14 guiding the rollers endwise into the race ring. The machine is readily adaptable for assembling bearings of other sizes by replacing the disc 28, ejector 22 and casing 14 by other similar parts, suitably dimensioned.

I claim:

1. In a machine for assembling rolling elements in openings of a separator, means for guiding rolling elements radially of the separator, means for supporting the rolling elements and rotating the separator to allow the rolling elements to enter the openings, and a casing having a wall concentric with and surrounding the separator to retain the rolling elements in the openings of the separator; substantially as described.

2. In a machine for assembling rolling elements in openings of a separator, a disc for holding the separator, means for guiding rolling elements radially towards the separator, means for rotating the disc to turn the separator, and a casing having a wall concentric with the separator to retain the rolling elements in the openings of the separator; substantially as described.

3. In a machine for assembling rolling elements in openings of a separator, a disc for holding the separator, the disc having recesses for the rolling elements, means for guiding rolling elements radially into the openings, means for rotating the disc to turn the separator, and a casing having a wall concentric with the separator to retain the rolling elements in the openings of the separator; substantially as described.

4. In a machine for assembling rolling elements in openings of a separator, a casing having a radial slot, means for rotating the separator in the casing to carry the openings successively into alignment with the slot, and means for feeding rolling elements through the slot into the openings; substantially as described.

5. In a machine for assembling rolling elements in openings of a separator, a casing having a radially extending slot arranged out of the horizontal, means for rotating the separator in the casing to carry the openings successively into alignment with the slot, and a chute for feeding rolling elements into the slot; substantially as described.

6. In a machine for assembling rolling elements in openings of a separator, a casing having a radially extending slot, a disc in the casing for holding the separator, means for rotating the disc to turn the separator, and means for feeding rolling elements through the slot into the openings; substantially as described.

7. In a machine for assembling rolling elements in openings of a separator, a casing having a radially extending slot, a disc in the casing for holding the separator, the disc having recesses in its periphery to fit the rolling elements, means for rotating the disc to turn the separator, and means for feeding rolling elements through the slot into the openings; substantially as described.

8. In a machine for assembling rolling elements in openings of a separator, a disc for holding the separator, means for guiding rolling elements radially of the disc, and means for rotating the disc to turn the separator; substantially as described.

9. In a machine for assembling rolling elements in openings of a separator, a disc for holding the separator, means for guiding rolling elements radially of the disc, means for rotating the disc to turn the separator, and a member having a wall concentric with the disc and separator to retain the rolling elements in the separator openings; substantially as described.

10. In a machine for assembling rolling elements in openings of a separator, a disc for holding the separator, means for guiding rolling elements radially of the disc, the disc having recesses to cause the rolling elements to lock the separator to the disc, and means for rotating the disc to turn the separator; substantially as described.

11. In a machine for assembling rolling elements in openings of a separator, means for holding and rotating the separator, means for guiding rolling elements into the openings of the separator, and an ejector for pushing the filled separator endwise into an outer race ring; substantially as described.

12. In a machine for assembling rolling elements in openings of a separator, a disc for holding and rotating the separator, means for guiding rolling elements into the openings of the separator, an ejector for pushing the filled separator endwise into an outer race ring, and means for retracting the ejector and starting rotation of the disc; substantially as described.

13. In a machine for assembling rolling elements in openings of a separator, means for holding and rotating the separator, means for guiding rolling elements into the openings of the separator, a casing surrounding the separator and having means to locate an outer race ring concentric with the separator, and an ejector for pushing the filled separator endwise into the outer race ring; substantially as described.

14. In a machine for assembling rolling elements in openings of a separator, means for guiding rolling elements radially of the separator, means for rotating the separator to allow the rolling elements to enter the openings of the separator, means for supporting an outer race ring concentric with the separator, and means for causing relative axial movement between the filled separator and the outer race ring; substantially as described.

15. In a machine for assembling rolling elements in openings of a separator, means for holding and rotating the separator, a casing having a slot through which rolling elements pass to the separator, and an ejector having means for cutting off the supply of rolling elements; substantially as described.

16. In a machine for assembling rolling elements in openings of a separator, means for holding and rotating the separator, means for guiding rolling elements into the openings of the separator, an ejector, spring actuated means for advancing the ejector to push the filled separator into an outer race ring, and a treadle for retracting the ejector; substantially as described.

17. In a machine for assembling rolling elements in openings of a separator, a disc for holding and rotating the separator, the disc having end projections to locate the separator endwise, and means for guiding rolling elements into the openings of the separator; substantially as described.

18. In a machine for assembling rolling elements in openings of a separator, a device for holding the separator, means for guiding rolling elements into the openings of the separator, means for holding the rolling elements in the openings, and mechanism for delivering the filled separator into an outer race ring; substantially as described.

19. In a machine for assembling rolling elements in openings of a separator, a device for holding the separator, means for guiding rolling elements into the openings of the separator, and a casing having a cylindrical wall surrounding the rolling elements to retain them in the openings of the separator; substantially as described.

20. In a machine for assembling bearings, means for holding rolling elements in a circular recess, a device for locating an outer race ring concentric with the series of rolling elements, and an ejector for pushing the series of rolling elements endwise into the outer race ring; substantially as described.

In testimony whereof I hereunto affix my signature.

RAYMOND H. CRAMER.